Aug. 9, 1932.  J. KUCHAR  1,870,573
VEHICLE AND REMOVABLE BODY THEREFOR
Filed Dec. 3, 1928  4 Sheets-Sheet 1
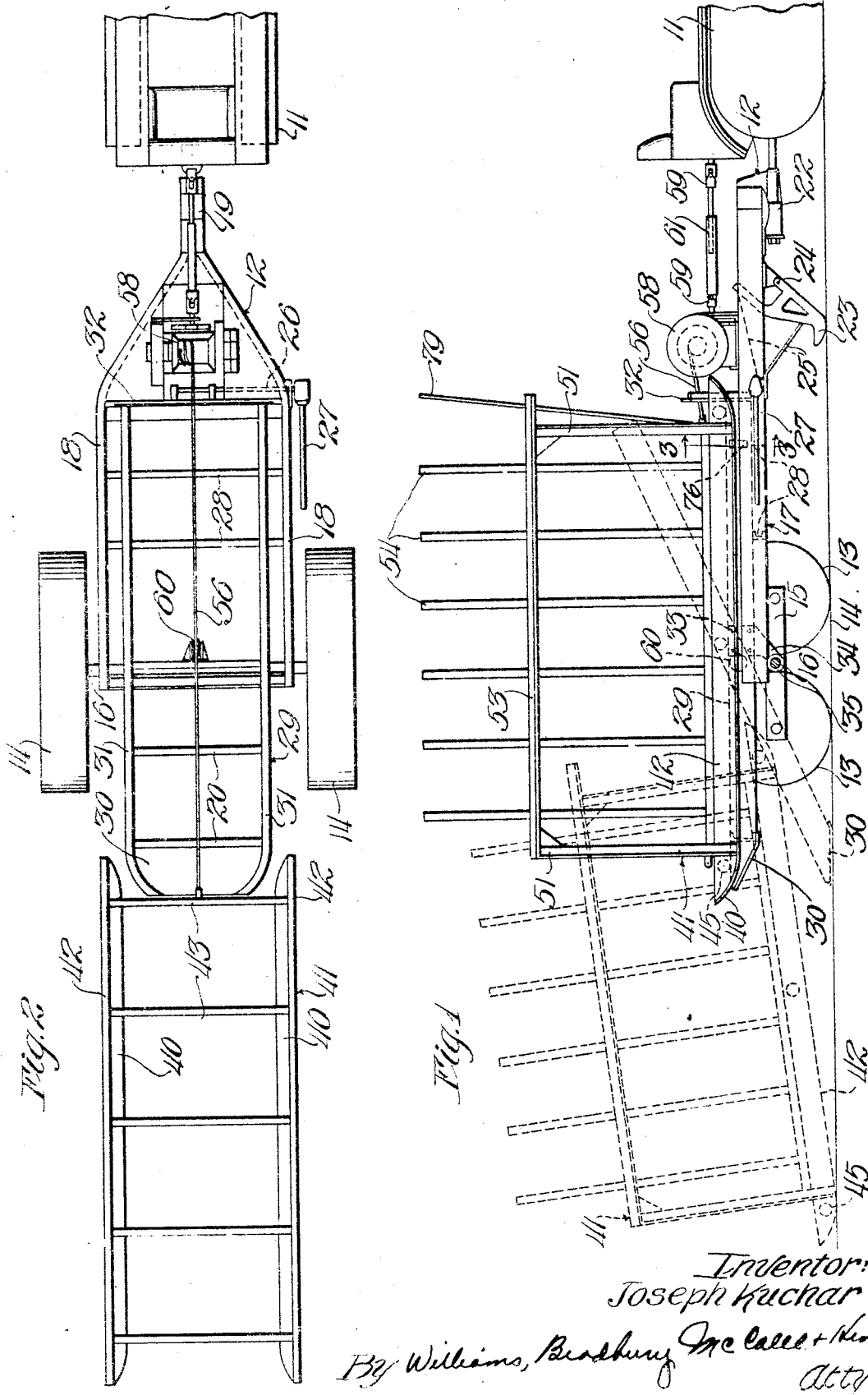
Inventor:
Joseph Kuchar
By Williams, Bradbury, McCall & Kimble
Attys Aug. 9, 1932. J. KUCHAR 1,870,573
VEHICLE AND REMOVABLE BODY THEREFOR
Filed Dec. 3, 1928 4 Sheets-Sheet 2
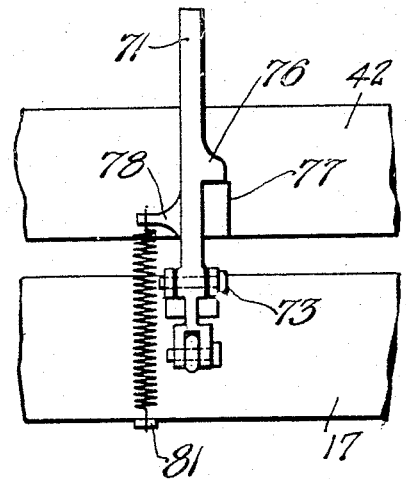
Fig.4.
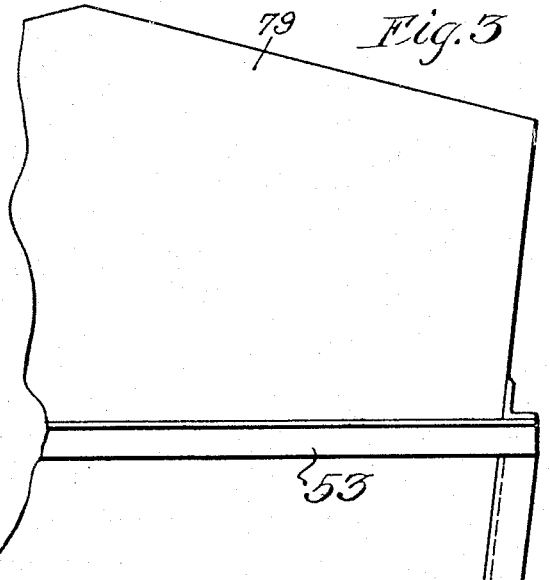
Fig.3.
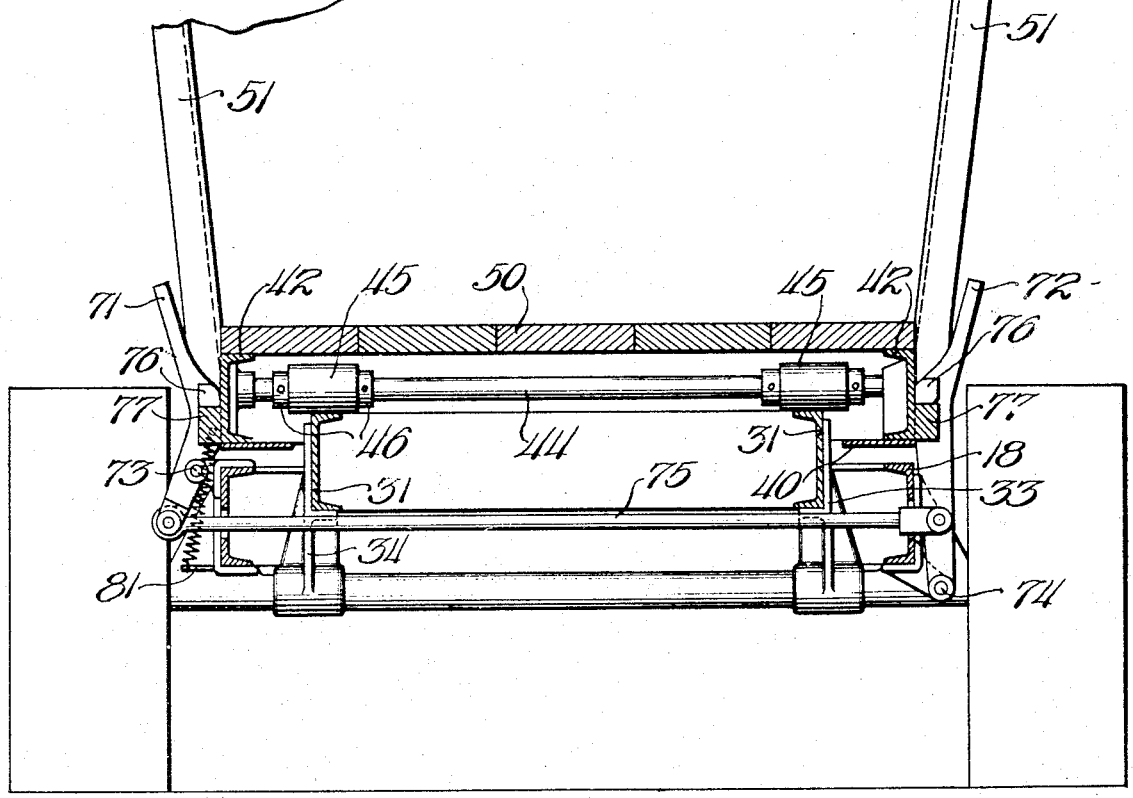
Inventor:
Joseph Kuchar
By Williams, Bradbury, McCaleb + Hinkle
Attys.

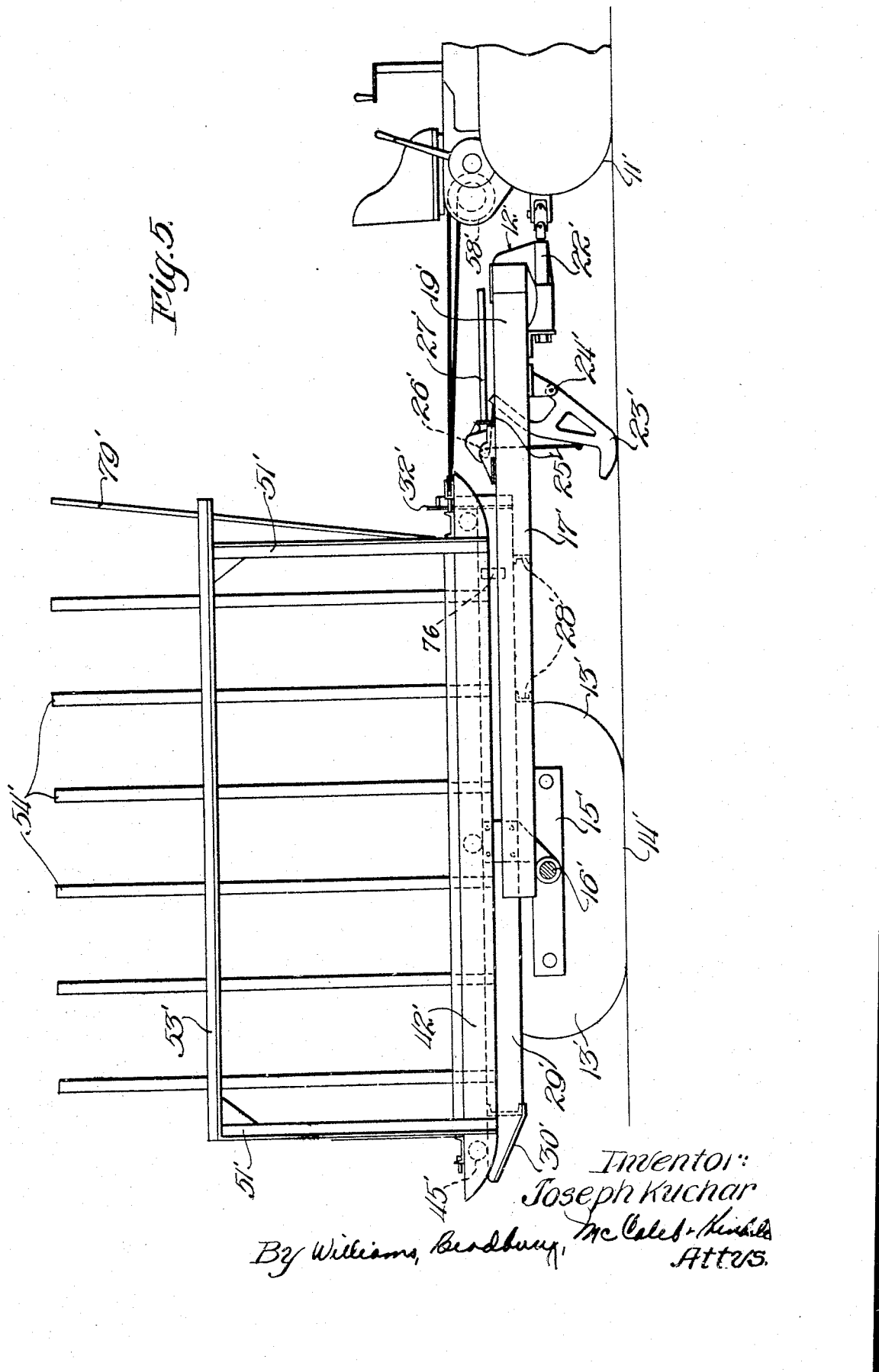

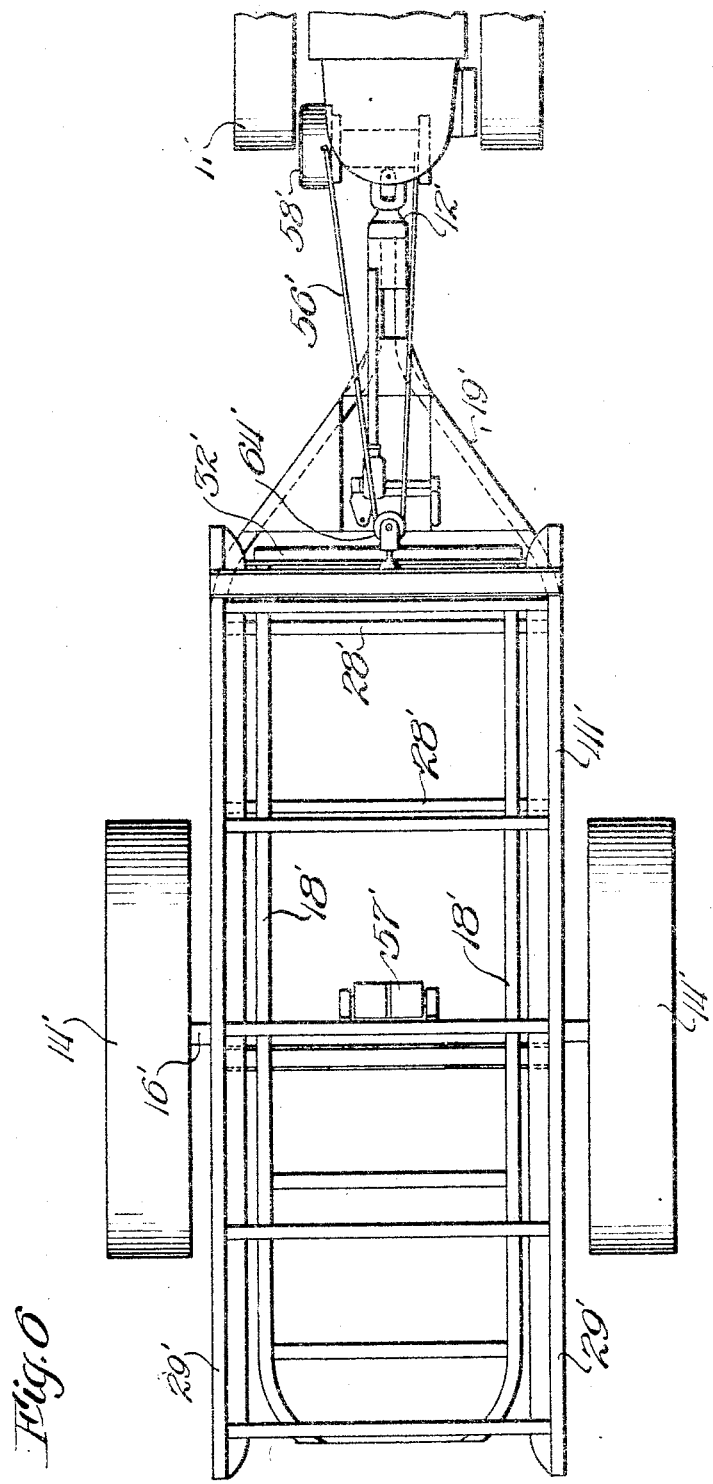

Patented Aug. 9, 1932

1,870,573

UNITED STATES PATENT OFFICE

JOSEPH KUCHAR, OF CHICAGO, ILLINOIS, ASSIGNOR TO ATHEY TRUSS WHEEL CO., OF CHICAGO, ILLINOIS, A CORPORATION OF ILLINOIS

VEHICLE AND REMOVABLE BODY THEREFOR

Application filed December 3, 1928. Serial No. 323,222.

My invention relates to vehicles.

It will be described with reference to a vehicle particularly adapted to handle removable load-carrying bodies.

In harvesting crops such as, for instance, sugar cane, vehicles are employed which are driven or drawn by a tractor into the field where they are loaded and after being loaded they are transported with their load to the cane presses or other destination. The loading of the vehicles consumes considerable time,—often much longer than the time required for transport. In view of the fact that a vehicle suitable for this purpose is relatively expensive, since it is frequently of the self-laying track type adapted for passing over miry or other soft ground, while the body or rack which holds the cane is of relatively simple construction and inexpensive, a large saving in the cost of harvesting can be effected by providing a vehicle with one or more removable bodies which are deposited on the ground in various places for loading and unloading while the vehicle is kept in constant operation, transporting the loaded bodies to their destination and the empty bodies back to the fields. The bodies are also more easily loaded when on the ground since they are then lower than when upon the vehicle. At the place where the loaded body is delivered, the loaded body may be removed from the vehicle and an empty body loaded on the vehicle thereby obviating the necessity of having the vehicle remain idle while the load is being removed from the body.

An object of the present invention is to provide an improved vehicle and removable body therefor.

A further object is to provide a vehicle having means for facilitating the loading of a removable body thereon.

A further object is to provide a removable body having means for cooperating with a vehicle for loading the body on the vehicle.

A further object is to provide a vehicle having a supporting cradle for a removable body, the cradle being movable relative to the vehicle to aid in loading the removable body on the vehicle.

A further object is to provide a vehicle with a tiltable cradle for supporting a removable body in which the cradle is held by gravity in either its normal or tilted position.

Other objects and advantages will hereinafter appear.

In accordance with the general features of the invention, a motor vehicle is provided with a tilting cradle which forms an inclined plane from the ground to the vehicle when tilted, permitting a loaded body to be drawn upon the cradle by a power driven capstan mounted on the forward end of the vehicle and having a cable wound thereon and attached to the removable body. The cradle and body assume a horizontal position on the vehicle after the body is drawn upon the vehicle far enough to bring the center of gravity forwardly of the pivot point of the cradle. The body is then drawn to its proper position on the vehicle and locked thereto to securely retain it thereon during transportation.

In the drawings,

Fig. 1 is a fragmentary side elevation of a vehicle comprising a trailer attached to a tractor for transporting the trailer and a removable body mounted on the trailer.

Fig. 2 is a plan view of the apparatus shown in Fig. 1 with the body removed and showing the body without the floor and superstructure.

Fig. 3 is an enlarged cross-sectional view of the apparatus taken on the line 3—3 of Fig. 1.

Fig. 4 is an enlarged detail side view of the mechanism for locking the removable body to the vehicle.

Fig. 5 is a side elevation of a tractor and trailer illustrating a modified form of the invention; and Fig. 6 is a plan view of the apparatus shown in Fig. 5, similar to Fig. 2.

Referring to the drawings, a tractor 11 is shown to which a vehicle in the form of a trailer 12 is attached. The trailer has a running gear of the self-laying track type in which a pair of wheels 13 roll on an endless chain 14. A vehicle of this type is disclosed in the patent of I. H. Athey No. 1,435,788, November 14, 1922. Wheels 13 are rotatably supported upon a beam 15 which is carried by a shaft 16. Shaft 16 supports a frame 17 comprising a pair of longitudinal sills 18. Sills 18 converge at their forward end and meet at the apex of a triangle from where they continue parallel for a short distance forming a tongue 19 which carries a coupling 22 by which the trailer is attached to the tractor. A foot 23 is pivotally attached to the frame at 24. Chains 25 are attached to the foot and pass around a shaft 26 in such a manner that when the shaft is rotated one of the chains will be wound upon the shaft while the other is unwound. A lever 27 serves to rotate shaft 26 to position the foot under the frame of the trailer so as to support it in a horizontal position when the trailer is not attached to the tractor and move the foot free from the ground when the trailer is attached to and supported by the tractor.

Sills 18 of the frame are supported and held in spaced relation by a plurality of channel shaped braces 28 which are approximately one-half the height of the sills. Braces 28 form a support for a tiltable cradle or carriage 29 when the cradle is in its normal horizontal position.

The cradle comprises a pair of longitudinally extending beams 31 which are connected together by a plurality of channel shaped ties 20 and at their forward end they are provided with an arched cross tie 32. At the rearward end the beams converge in an arch, the upper surfaces of the beams remaining in the same plane, while the lower surfaces are tapered towards the end and carry a shoe 30 forming a surface which lies flat upon the ground when the cradle is in its titled position.

Beams 31 are attached to a pair of brackets 33 at their midpoint. Brackets 33 have a bent arm 34 which extends rearwardly and carries a bearing 35 for pivotally mounting the brackets on shaft 16. By this construction the center of gravity of the cradle or carriage will be forward of the pivot point when the cradle is in its normal horizontal position, and when the cradle is tilted the center of gravity will shift rearwardly about axle 16 to the left of the axle so that the cradle will be held in either its horizontal or tilted position by gravity.

A removable body 41 is adapted to be supported upon the cradle or carriage of the trailer. The removable body is provided with a pair of longitudinally extending supports 42 preferably channel shaped, which taper upwardly at their ends and have runners 40 attached to their lower side which serve as skids when the body is dragged along the ground. The runners 40 are made wide enough to prevent the body from cutting into the ground when the ground is soft or miry. Supports 42 are held in spaced relation by a plurality of channel-shaped braces 43. A plurality of shafts 44 are located between the supports and a pair of rollers 45 is mounted upon each shaft 44. The rollers are held in a definite spaced position upon a shaft by a collar 46 located at each side of the roller, the collars being retained in position by means of the set screws. Rollers 45 are spaced apart such a distance upon their shafts as to coincide with the spacing of the beams 31 of the tiltable cradle so that when the removable body is drawn upon the cradle, rollers 45 will roll upon the beams. The shafts carrying the rollers are mounted upon the supports in such a position that the lower surface of the rollers is above the lower edge of the runners. In this manner the body will rest upon its runners when positioned on the ground and the rollers will come into operation only when the body rests upon the cradle.

The body may be provided with a floor 50 which is supported on braces 43. A plurality of upright arms 51, preferably one at each corner, are secured at their lower ends to the body and support a horizontally rectangular frame 53. A plurality of stays 54 are attached to the body and the frame forming a rack suitable for receiving sugar cane or other similar material. The front end of the rack may be provided with an end gate 79. A chain or cable 56 is attached to an eye-bolt in the forward end of the body and passes over a pulley 60 mounted on the tiltable carriage to a capstan 58 mounted upon the forward end of the trailer. The capstan is connected by a driving connection including a pair of universal joints 59 and an extensible shaft 61 to the motor of the tractor for the purpose of rotating the capstan to wind the cable thereon and draw the body upon the tiltable carriage.

The operation of the apparatus described is as follows:

When it is desired to load a body upon the trailer the trailer is backed to the body. The carriage is then moved to its tilted position in which it will be retained by gravity, and the chain or cable from the capstan is attached to the body. The capstan is then rotated to wind the cable thereon and draw the body toward the vehicle. The body will slide along the ground upon its runners 40 until the foremost rollers 45 engage the tilted carriage. The body will then be drawn up the inclined plane formed by the tilted carriage, the rollers rolling upon the rails formed by beams 31.

Since the rollers are spaced above the lower edge of runners 40, the runners 40 will overlap the rails of the carriage and thus guide the body upon the carriage. When the body reaches a point upon the carriage in which the downward pull of the cable upon the body together with the weight of the body to the right of the pivot point exceeds the weight of the body to the left of the pivot point, the carriage and body will assume a horizontal position. The capstan is rotated until the body has been drawn to the proper position upon the vehicle, when the body and carriage may be locked to the frame of the vehicle.

The device for locking the body to the vehicle frame comprises a pair of latches 71 and 72. Latch 71 is pivoted to frame 17 at 73 and latch 72 is pivoted to the frame 17 at 74. A rod 75 is attached to latch 71 below its pivot point and to latch 72 above its pivot point so that when either of the latches is moved away from the body the other latch will also move away from the body and when either of the latches is moved toward the body the other latch will be moved toward the body. This construction permits the latches to be operated from either side of the body. Each of the latches has a hook 76 extending forwardly which fits over a rectangular boss 77 on the body so as to prevent the body from moving either upwardly or rearwardly when the latches engage the bosses. Latch 71 has an arm 78 extending rearwardly to which a spring 79 is attached. The other end of this spring is secured to an arm 81 in such a position that as the latch is moved toward and away from the body the spring will pass the pivot point of the latch so that the latch will be held in either position by the spring.

In the transportation of sugar cane, when the tractor and trailer arrive in the field with an empty body, the body is taken to a place to be loaded and removed from the trailer. The trailer is then transported to a body which has been loaded in the meantime, and the loaded body is placed upon the trailer and transported to its destination. In this manner the trailer and tractor may be kept in continuous operation.

In the apparatus shown, in Figs. 5 and 6, a slightly modified form of the invention is illustrated, similar parts being indicated by primes. In this apparatus a capstan 58' is mounted directly upon the tractor, and a cable 56' extends from the capstan over a cylindrical pulley 57 carried by the tiltable cradle to a pulley 64 attached to the forward end of body 41' and returns over pulley 57' and is anchored to the tractor. In this manner the force applied to the cable by the capstan is multiplied, decreasing the power required of the tractor to load the body on the trailer.

The invention has been described with reference to a trailer drawn by a tractor, but it is evident that the operation of the apparatus would be the same if the body carrying vehicle were made a permanent part of the tractor as in a truck, and the term vehicle as used in this specification is intended to include a truck as well as a tractor and trailer.

Having described the nature and embodiments of my invention, what I claim as new and desire to secure by Letters Patent of the United States is:

1. In a vehicle, a frame, a tiltable support on said frame adapted to be tilted to form an inclined plane from the ground to the frame, a removable body for the vehicle comprising a pair of longitudinally extending runners to serve as skids when the body is upon the ground, laterally extending rollers on said body having their bearing surfaces disposed above the plane of the lower surface of and laterally within said runners and adapted to engage and roll upon said tiltable support, said runners being disposed to engage said tiltable support for guiding said body and for preventing lateral displacement thereof when positioned on said support.

2. A removable body for a vehicle comprising load supporting means, laterally spaced runners fixed to said means and adapted to serve as skids when said body is resting on the ground, rollers for said body having their bearing surfaces disposed above the plane of the lower surface of said runners and adapted to support said body when positioned on a vehicle, said runners being adapted to protect said rollers when on the ground and to prevent lateral displacement of the body when on the vehicle.

In witness whereof, I hereunto subscribe my name this 19 day of November, 1928.

JOSEPH KUCHAR.